US007493963B2

(12) United States Patent
Ford

(10) Patent No.: US 7,493,963 B2
(45) Date of Patent: Feb. 24, 2009

(54) ADJUSTABLE HORSE-BOOT BUCKLE

(75) Inventor: Garrett N. Ford, Tucson, AZ (US)

(73) Assignee: Easycare, Inc., Tucson, AZ (US)

( * ) Notice: Subject to any disclaimer, the term of this patent is extended or adjusted under 35 U.S.C. 154(b) by 0 days.

(21) Appl. No.: 11/973,111

(22) Filed: Oct. 5, 2007

(65) Prior Publication Data

US 2008/0083542 A1 Apr. 10, 2008

Related U.S. Application Data

(60) Provisional application No. 60/850,686, filed on Oct. 10, 2006.

(51) Int. Cl.
*A01L 7/00* (2006.01)
*B68C 5/00* (2006.01)

(52) U.S. Cl. ............................................ 168/18; 54/82

(58) Field of Classification Search .................. 168/18, 168/17, 1, 2; 36/111; 54/82
See application file for complete search history.

(56) References Cited

U.S. PATENT DOCUMENTS 483,602 A * 10/1892 Covell ........................ 168/22
513,360 A * 1/1894 Covell ........................ 168/22
3,703,209 A * 11/1972 Glass ........................ 168/18
3,732,929 A * 5/1973 Glass ........................ 168/18
4,174,754 A * 11/1979 Glass ........................ 168/18
5,661,958 A * 9/1997 Glass et al. .................... 54/82
5,692,569 A * 12/1997 Constantino et al. .......... 168/17
2005/0066632 A1* 3/2005 Ford et al. .................... 54/82
2006/0064950 A1* 3/2006 Ford et al ..................... 54/82

* cited by examiner

*Primary Examiner*—Son T. Nguyen
(74) *Attorney, Agent, or Firm*—Antonio R. Durando; Tobias Lewenstein

(57) ABSTRACT

A horse boot buckle includes a plate with cable eyelets and six cable guides that provide multiple tension adjustments. In addition, the buckle lever includes three alternative grooves for engaging the tensioning cable, thereby providing additional tensioning adjustment. The tensioning cable is hooked to the upper on both sides of its front rim. The buckle lever is pointing up in its closed position, thereby preventing accidental release of the tension on the cable.

3 Claims, 6 Drawing Sheets

10
22
20
14
22
18
12
16
24
26
30
28
32

ADJUSTABLE HORSE-BOOT BUCKLE

RELATED APPLICATIONS

This application is based on and claims the priority of U.S. Provisional Application No. 60/850,686, filed Oct. 10, 2006.

BACKGROUND OF THE INVENTION

1. Field of the Invention

The invention relates in general to boots for horses and, in particular, to an adjustable buckle to provide a variable degree of tension on the boot's shell to conform to different sizes of hooves.

2. Description of the Prior Art

Horse boots are used to protect the hooves and fetlocks of horses and are sometimes used in lieu of horseshoes. A horse boot typically includes a sole with opposed flat, top and bottom, major surfaces and an upper that projects upward from the top surface and forms an enclosure for the hoof and a portion of the fetlock of the horse. The upper typically extends along the rim of the sole, has a bottom edge secured to the sole, and includes a flexible front tongue that can be extended forward to facilitate placement of the hoof into the boot. A portion of the top edge of the upper is remote from the sole and is sometime connected to a cuff that can be tightened around the hoof and pastern of the horse.

The tongue in the upper and the cuff (if present) are spread open in order to put the boot on the hoof of the horse. After spreading the upper and the cuff, the boot is slid over the hoof and the cuff is tightened around the pastern to secure the boot in place. While several means of tightening have been used in the art, such as laces and straps, one common mechanism consists of a cable attached to the two top-front sides of the upper and connected to a buckle mounted on the tongue. As the buckle is pivoted closed, it pulls on the cable and thereby tightens both front ends of the upper around the hoof.

A problem common to most tightening devices is the fixed tension provided thereby, or the small-range degree of adjustment available in relation to the variation in the size and shape of horses' hooves. Even among horses wearing the same size boot (which is determined by the size of the footprint of the hoof), the shape of the hoof's top portion varies from horse to horse, requiring different degrees of tension in order to secure the boot on the hoof. A rotary cable tensioner used in the art (known under the registered trademark BOA) is available to provide a relatively large range of tension applied to the upper of the boot, but it is complex in construction and relatively expensive. Therefore, a buckle arrangement that is simpler and cheaper to manufacture would be preferable.

Most existing boot buckles operate by pulling the cable as the buckle lever is closed forward and downward. This configuration is prone to accidental opening of the buckle while the horse is moving because any obstacle brushed against during the downward motion of the hoof is likely to release the buckle. This is another problem associated with conventional horse boot buckles. This invention is directed at providing a solution to both these problems. Specifically, the invention is directed at providing a horse boot buckle with a wide range of tension adjustment and greater stability during use.

SUMMARY OF THE INVENTION

The invention consists of an upward and backward closing buckle mounted on the tongue of the horse boot. The buckle includes a plate with cable eyelets and six cable guides that provide multiple tension adjustments. In addition, the buckle lever includes three alternative grooves for engaging the tensioning cable, thereby providing additional tensioning adjustment. Altogether, the six guides and the three grooves afford 30 distinct levels of tensioning.

According to another aspect of the invention, the tensioning cable coupled to the buckle is shorter than in prior-art horse boots. Rather than being strung around the entire top portion of the upper to form a complete loop around the hoof, the cable of the invention is hooked to the upper on both sides of its front rim. As a result, the shorter cable does not have to run and rub against pivot points in the upper of the boot and is less prone to wear and breakage. This shorter cable also requires less travel of the buckle lever to provide a predetermined degree of closure of the boot around the hoof.

Additional features and advantages of the invention will be forthcoming from the following detailed description of certain specific embodiments when read in conjunction with the accompanying drawings.

DESCRIPTION OF THE PREFERRED EMBODIMENTS

Figure 1:
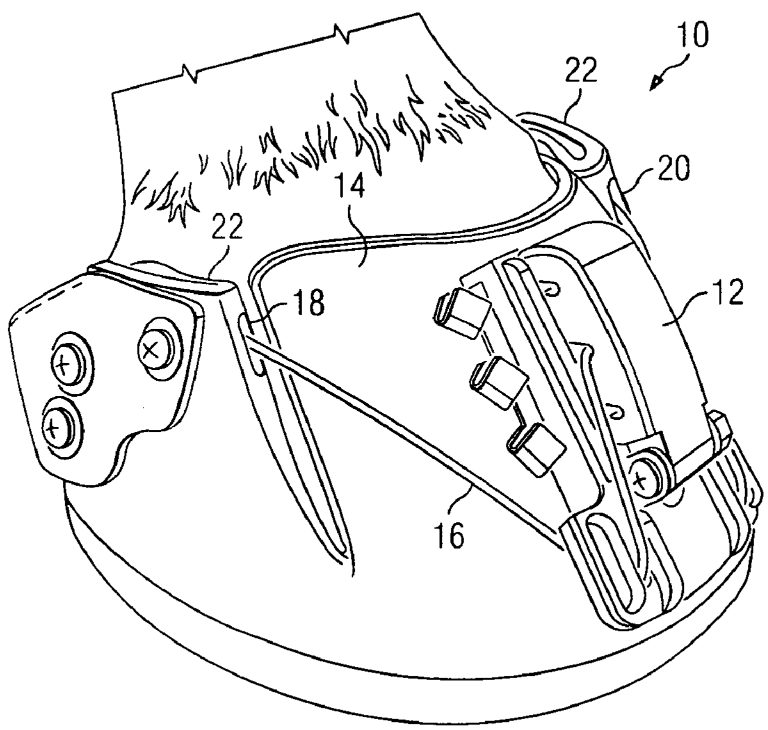
FIG. 1 shows in side perspective view a conventional horse boot wherein a buckle according to the invention has been mounted on the boot's tongue.
Figure 2:
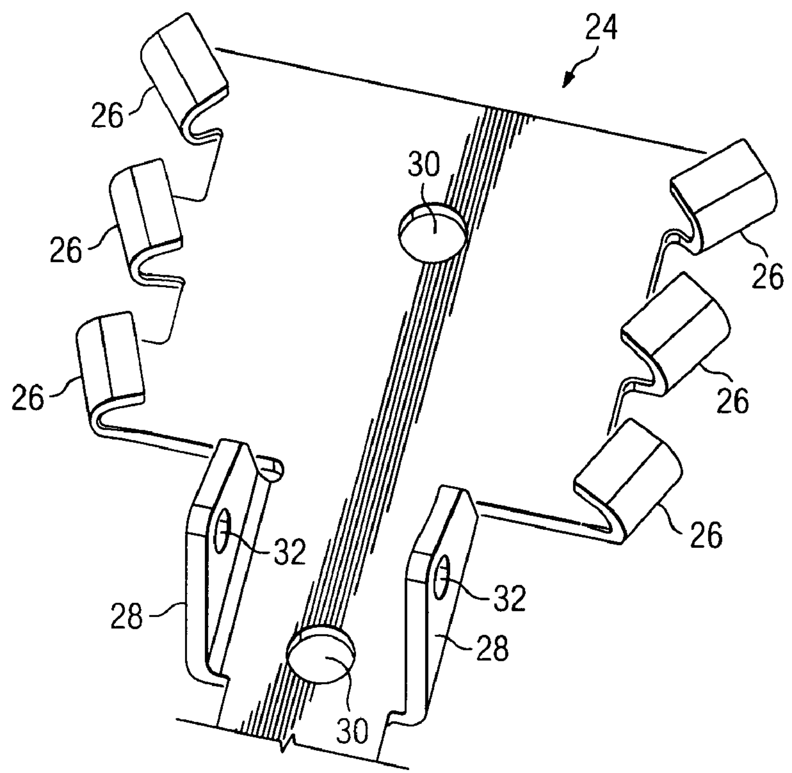
FIG. 2 is a perspective view of the cable-guide plate of the buckle of the invention.

Referring to FIG. 1, a conventional horse boot 10 is illustrated with a buckle 12 according to the invention mounted on the tongue 14 of the boot. A cable 16 is anchored on each front side 18,20 of the rim 22 of the upper of the boot and is threaded through the buckle for tensioning. The buckle 12 includes three components. As shown in FIG. 2, the first component consists of a cable-guide plate 24 that includes a set of cable guides 26 on each side and bracket arms 28 extending upward from the plate. The plate 24 has two vertical perforations 30 for securing it to the tongue 14 of a horse boot with rivets or similar fastening devices. Two horizontal perforations 32 on the bracket arms 28 are provided to connect a buckle lever pivotally to the plate 24.

Figure 3:
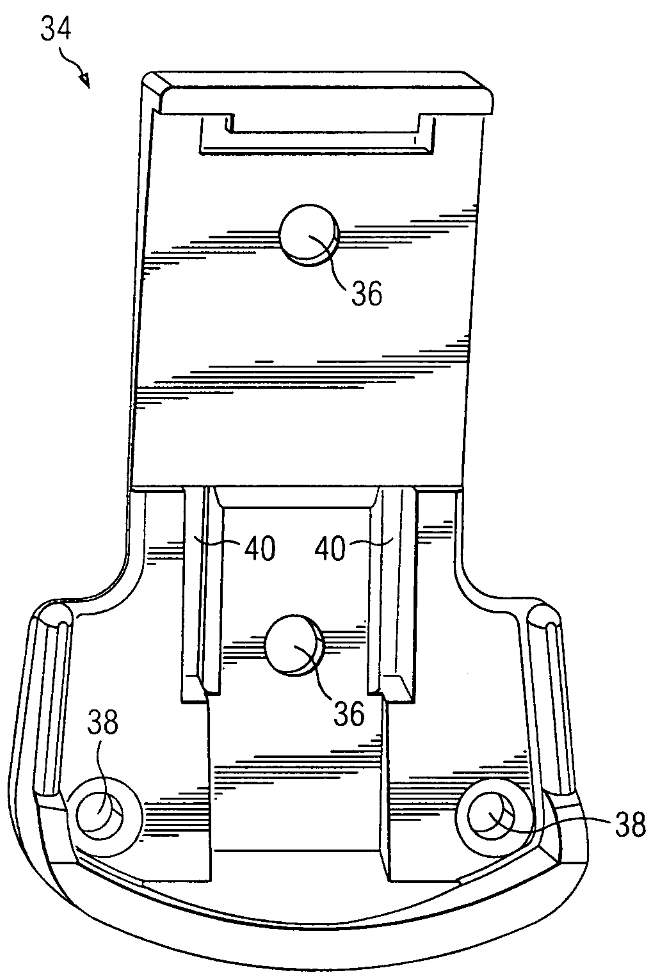
FIG. 3 is a top perspective view of the frame plate of the buckle of the invention.
Figure 4:
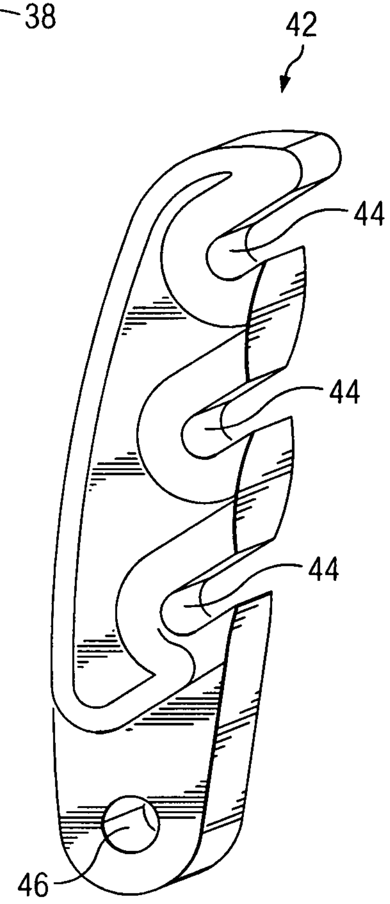
FIG. 4 is a perspective view of the buckle lever of the buckle of the invention.

FIG. 3 illustrates a frame plate 34 designed to provide support to the buckle assembly mounted on the tongue of the boot. The frame plate includes two vertical perforations 36 corresponding, for alignment purposes, to the perforations 32 in the cable-guide plate 24. Two lateral eyelets 38 are also provided for receiving the cable 16 running through the buckle assembly, as detailed below. Finally, two longitudinal slots 40 allow the bracket arms 28 to protrude through the plate 34 for assembly.

Figure 5:
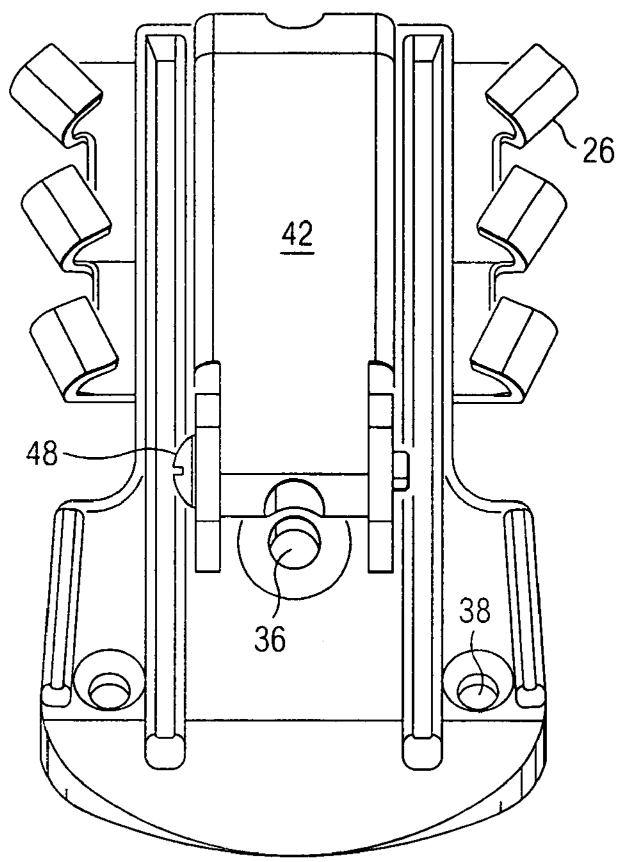
FIG. 5 is a top view of the three components of FIGS. 2-4 assembled into the buckle of the invention.

The third component of the buckle assembly is a buckle lever 42 that includes multiple grooves 44 (preferably three, as illustrated) for adjusting the tension of the cable 16 anchored to the upper of the boot. An opening 46 is provided in the buckle lever for pivotal connection with the bracket arms 28 by means of an axle 48, as shown in the assembled view of FIG. 5.

Figure 6:
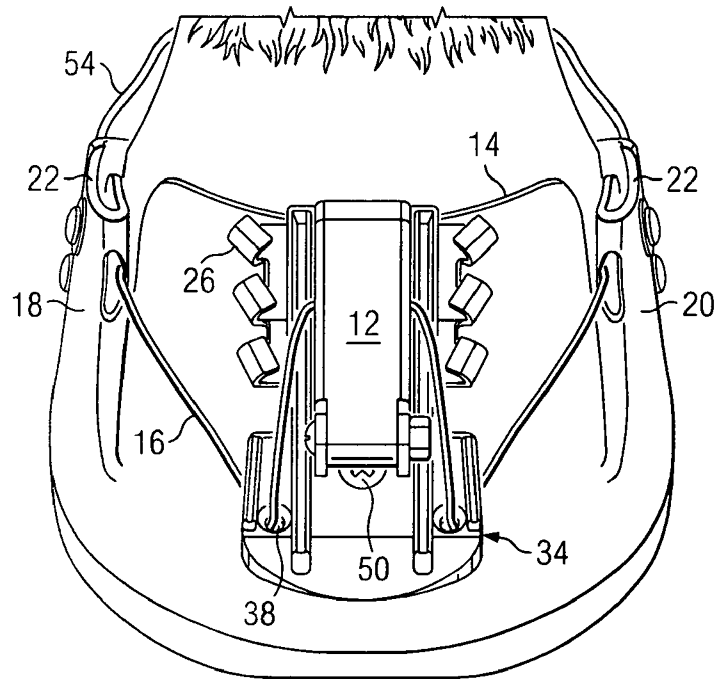
FIG. 6 shows the buckle assembly of FIG. 5 mounted on a horse boot.

FIG. 6 illustrates the buckle assembly of the invention is use on a conventional horse boot. The buckle assembly is attached to the tongue 14 of the boot by means of two screws 50, or similarly with rivets or other fastening devices. As shown, the cable 16 is anchored on one side 18 of the front rim of the upper 22; it is threaded through a corresponding eyelet 38 in the plate 34, a groove 44 in the buckle lever 42, and again through the eyelet 38 on the other side of the plate; and finally it is anchored to the other side 20 of the front rim of the upper. In the application illustrated in this figure, none of the cable guides 26 is used to shorten the cable 16. It is obvious, therefore, that the buckle can be adjusted to three different levels of tensioning by running the cable 16 through the three grooves 44 in the buckle lever.

Figure 7:
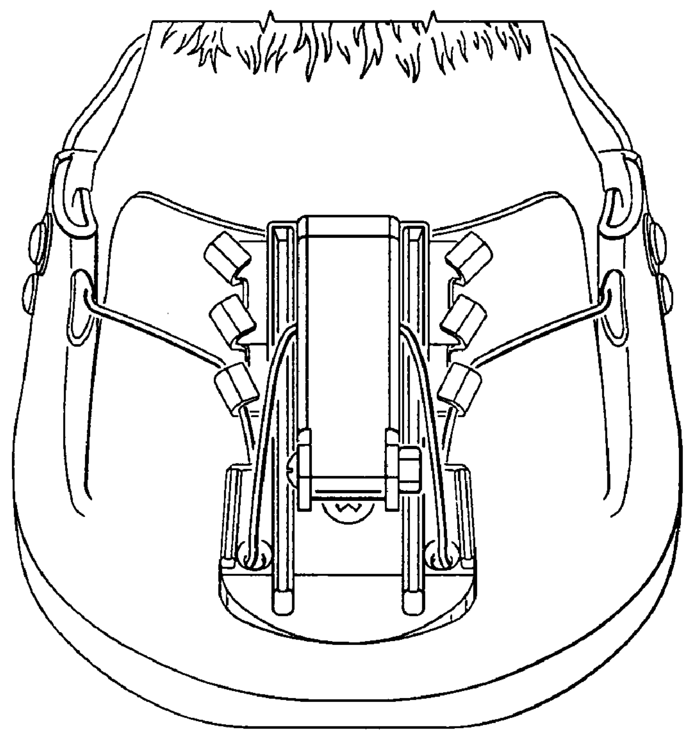
FIG. 7 shows the buckle assembly of FIG. 5 with the cable run through a first combination of cable guides.
Figure 8:
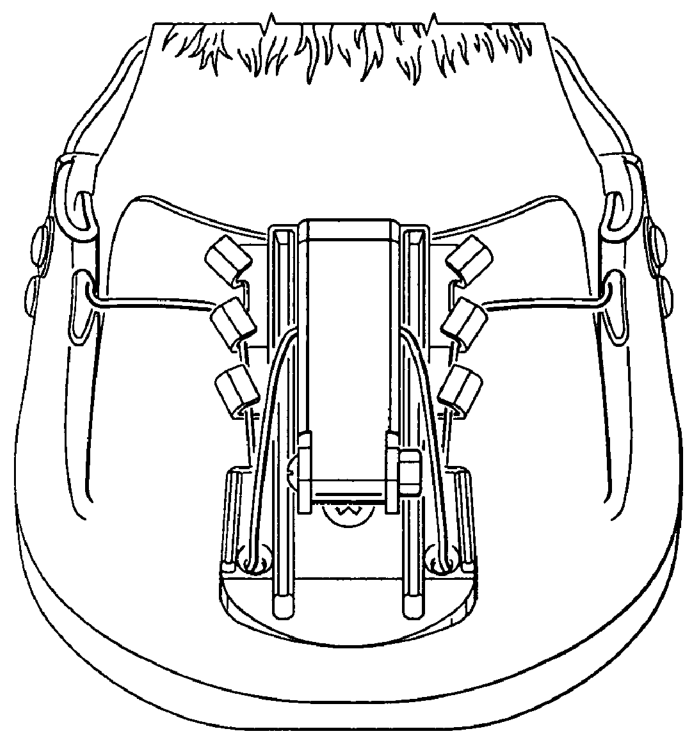
FIG. 8 shows the buckle assembly of FIG. 5 with the cable run through an alternative combination of cable guides.
Figure 9:
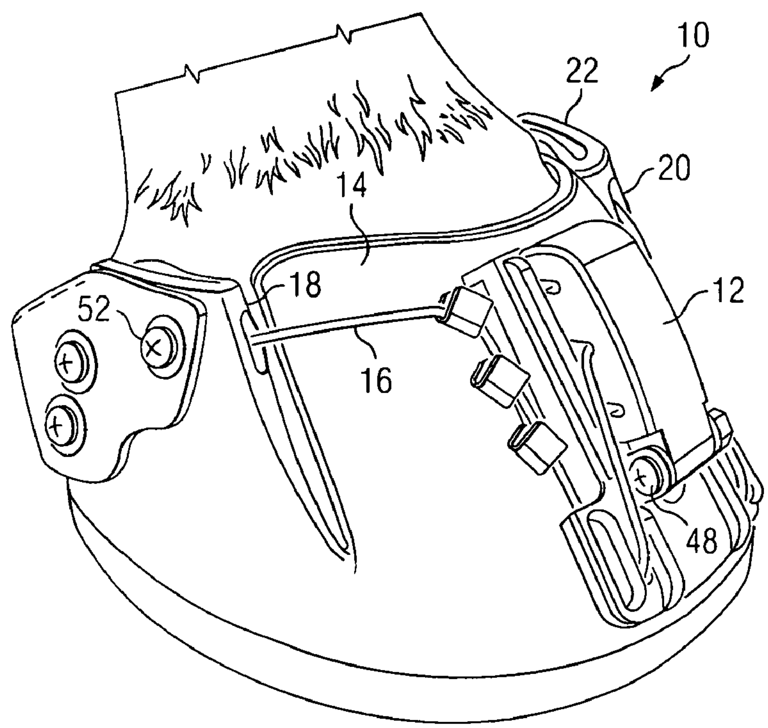
FIG. 9 shows the buckle assembly of FIG. 5 with the cable run through another alternative combination of cable guides.
Figure 10:
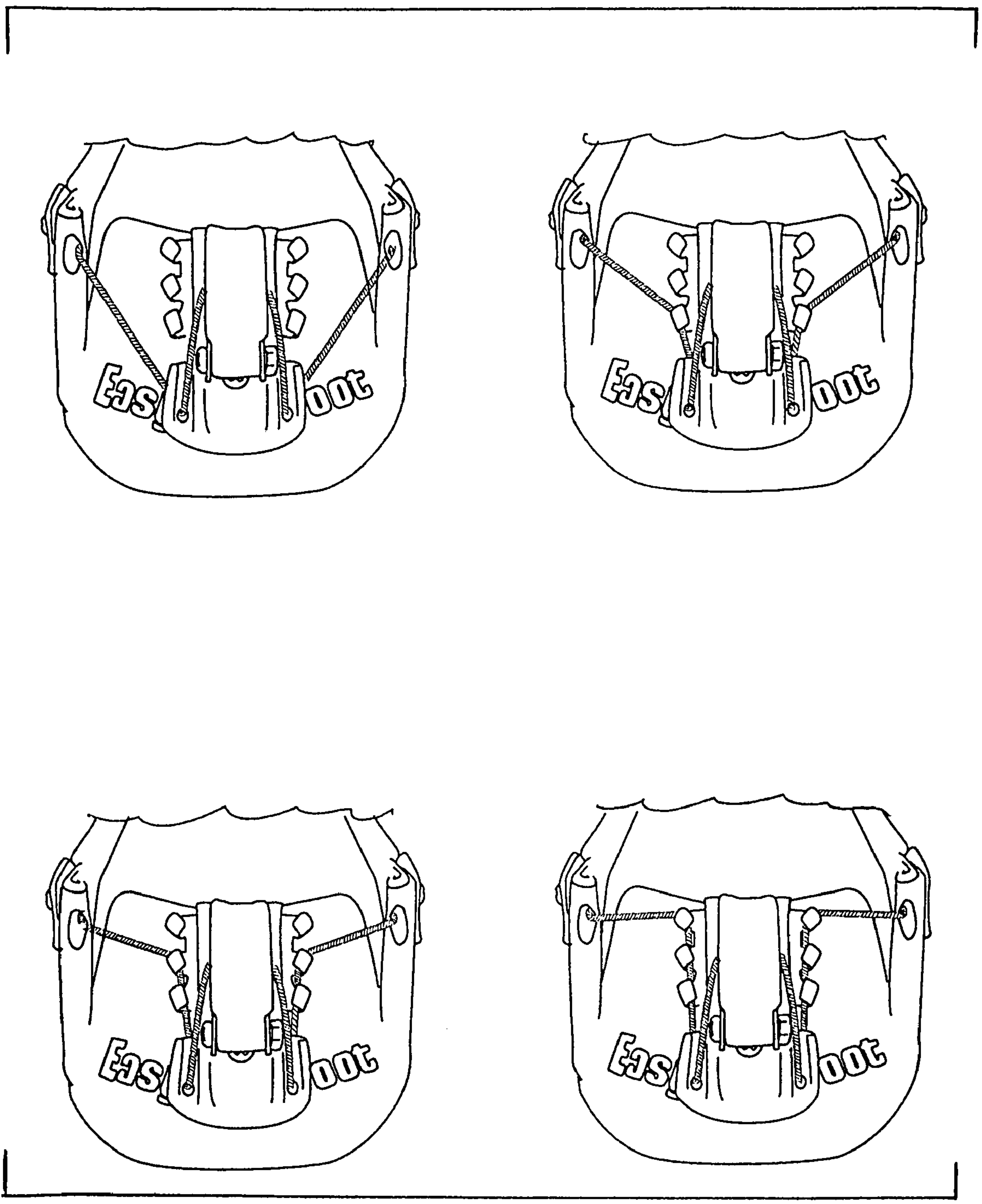
FIG. 10 illustrates side-by-side the four combinations of FIGS. 6-9.

FIGS. 7-9 illustrate the same buckle arranged with the cable running through three alternative symmetric combinations of cable guides 26. It is clear that each arrangement provides a different level of tensioning when the cable 16 is pulled by the buckle lever 42 during the operation of the buckle. FIG. 10 illustrates in side-by-side view the same alternative conditions available to a user to tighten the boot around the hoof of a horse as needed for best performance. Note that additional conditions are provided by the asymmetric use of the cable guides 26 (not shown). One skilled in the art will readily recognize that the three grooves in the buckle lever and the multiple cable positions provided by the six cable guides 26 and two eyelets 38 afford a total of 30 different tensioning adjustments. Clearly this number may be increased or decreased simply by providing more or less cable guides 26 in the plate 24 and/or grooves 44 in the buckle lever 42.

Figure 11:
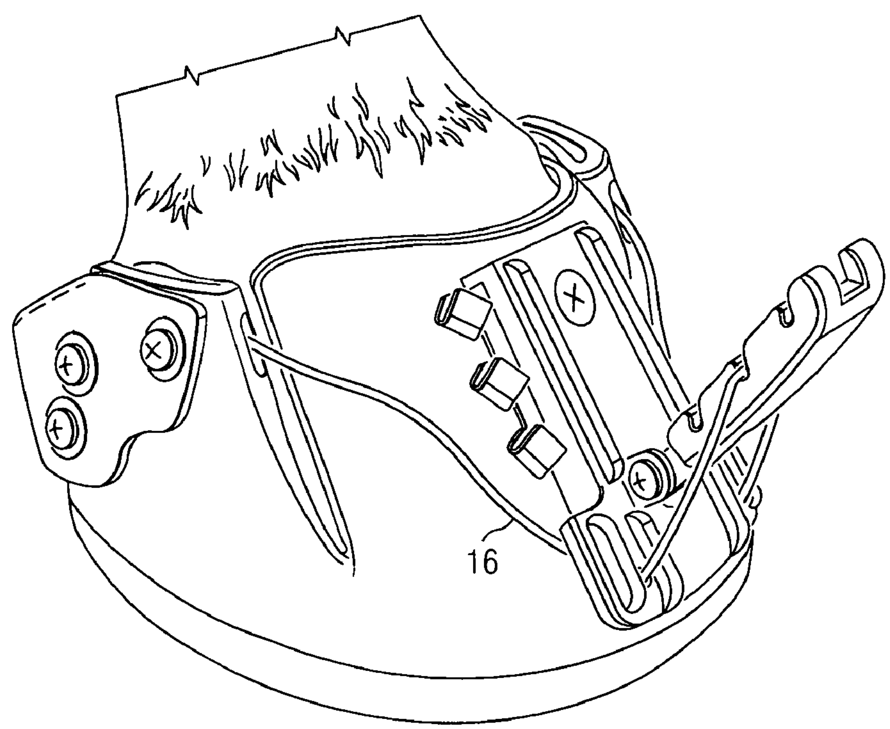
FIG. 11 shows the operation of the buckle lever in tensioning and releasing the cable.

As shown in FIG. 11, the action of the buckle lever is upward for tensioning the cable and downward for releasing it, opposite to the action in all prior-art buckles. Accordingly, the buckle can only be opened to release the tension on the cable by pivoting the lever 42 downward, which is very unlikely to occur accidentally during use. This is another advantage provided by the buckle of the invention.

It is understood that the specific size and shape of the various components of the buckle assembly may take any form deemed most appropriate for the application at hand. For example, the cable 16 is shown coupled to the rim of the upper by means of a bolt 52 and corresponding nut (not seen) also used to attach a gaiter 54 to the upper of the boot (see FIG. 6), but any suitable means of attachment would be acceptable to practice the invention. Similarly, the material of the buckle assembly may be different for different uses. It is anticipated that aluminum will be used for its relatively light weight combined with acceptable durability. Obviously, a different number of grooves in the lever and cable guides in the cable-guide plate may be used to change the range of available adjustments.

While the invention has been shown and described herein with reference to what are believed to be the most practical embodiments, it is recognized that departures can be made within the scope of the invention. For example, the buckle of the invention has been illustrated throughout as attached to the tongue of the horse boot; however, the buckle could be used in the same manner with the same advantages on a boot without a tongue, such as a rear-entry model. The buckle could also be attached to the rear portion of a horse boot (for instance, again, on the rear flap of a rear-entry boot). Similarly, the cable guides 26 and the eyelets 38 are described and illustrated as integral parts of respective plates 24,34 that form a unitary assembly attached to the tongue of the horse boot by common fastening devices. However, the invention could be implemented with the same advantages if the cable guides and eyelets were part of separate components individually attached to the tongue or other parts of the boot. Therefore, the invention is not to be limited to the details disclosed herein but is to be accorded the full scope of equivalent articles.

The invention claimed is:

1. An adjustable horse-boot buckle comprising:

a frame assembly attached to a horse boot;

a buckle lever pivotally connected to said frame assembly such that the lever reversibly rotates from a downward release position to an upward tensioned position;

six guides disposed symmetrically on each side of the buckle lever for receiving a tensioning cable connected to the buckle lever for securing the horse boot to a hoof of a horse; and three cable grooves in the buckle lever for providing alternative placements of said tensioning cable and corresponding alternative degrees of tensioning of said cable;

wherein said frame assembly is attached to a tongue of the horse boot and said six guides are incorporated into said frame assembly, the assembly further comprising two bracket arms for receiving the buckle lever.

2. The buckle of claim 1, wherein said frame assembly further includes a support plate with two lateral eyelets for receiving the tensioning cable and two longitudinal slots for allowing said bracket arms to protrude through the support plate and pivotally engage the buckle lever.

3. An adjustable horse-boot buckle comprising:

a frame assembly attached to a tongue of a horse boot, said frame assembly including a cable-guide plate with six cable guides and two bracket arms and including a support plate with two lateral eyelets and two longitudinal slots for allowing said bracket arms to protrude through the support plate;

a buckle lever with three cable grooves, said lever being pivotally connected to said bracket arms such that the lever reversibly rotates from a downward released position to an upward tensioned position;

a tensioning cable attached to two sides of an upper of the home boot, said cable running through said two eyelets and being operatively placed in one of the cable grooves into lever and in two of the six cable guides to produce a desired amount of cable tension in securing the horse boot to a hoof of a horse.

* * * * *